United States Patent [19]

Kiss et al.

[11] 4,236,597

[45] Dec. 2, 1980

[54] SOUND-ABSORBING DEVICE, ESPECIALLY FOR DAMPING OF NOISES EXPANDING IN AIR DUCTS

[75] Inventors: Sándor Kiss; Zsolt Nagy, both of Budapest, Hungary

[73] Assignee: Fütöber Épületgépészeti Termékeket Gyártó Vállalat, Budapest, Hungary

[21] Appl. No.: 894,375

[22] Filed: Apr. 7, 1978

[30] Foreign Application Priority Data

Apr. 8, 1977 [HU] Hungary .............................. FU-354

[51] Int. Cl.$^3$ .......................... F04F 17/04; F01N 1/24
[52] U.S. Cl. .................................... 181/224; 181/252; 181/256; 181/264
[58] Field of Search ............... 181/212, 217, 218, 219, 181/222, 224, 203, 248, 256, 252, 264

[56] References Cited

FOREIGN PATENT DOCUMENTS 1095504 12/1960 Fed. Rep. of Germany ........... 181/224

Primary Examiner—Richard A. Wintercorn
Assistant Examiner—Benjamin R. Fuller
Attorney, Agent, or Firm—Karl F. Ross

[57] ABSTRACT

A flow duct for the delivery of air for ventilation is of round cross section and is surrounded by a prismatic casing over the length of the duct. Sound-absorbing material is filled into the space between the casing and the duct and varies in radial thickness around the periphery of the duct as measured in a plane perpendicular to the axis thereof.

1 Claim, 8 Drawing Figures

SOUND-ABSORBING DEVICE, ESPECIALLY FOR DAMPING OF NOISES EXPANDING IN AIR DUCTS

FIELD OF THE INVENTION

The invention refers to a sound-absorbing device, limiting the expansion of noises produced in a ventilation device in the air ducts by absorption of sound over a wide frequency range of the noise spectrum.

BACKGROUND OF THE INVENTION

There are known sound-absorbing devices having an air duct with a round cross-section covered by a cylindrical sleeve of sound-absorbing material of constant thickness, and for the case of a square cross-section air duct, having differently arranged separating walls of sound-absorbing material.

The sound-absorbing characteristics of the sound-absorbing device are essentially determined by the thickness of the built-in sound-insulating material. It is a problem to damp the noises of deeper (lower) frequency, since this requires a thicker layer of sound-insulating material, thereby causing a reduction of the cross-section of the flow since an increased layer thickness of the sound-insulating material is necessary; this is no solution because of the resulting increase in the air speed, respectively the flow resistance.

Among the known sound-absorbing devices there are types (Soundstream) which have inserts whose shapes change sinusoidally in the direction of the air flow. This solution of the problem has the same limitations because of constriction of the air flow where thicker inserts are used.

OBJECT OF THE INVENTION

The object of the invention is to provide a sound-absorbing system in which the effective thickness of layers of sound-absorbing material is a multiple of that of the known arrangements, while its relation to the free flow cross-section is maintained within the generally accepted value 0.3–0.5.

SUMMARY OF THE INVENTION

The object of the present invention is a sound-absorbing device, particularly for damping sounds appearing in the air ducts of ventilation devices. The device according to the invention has at least one flow duct of the shape of a body of revolution, which is suitably either cylindrical or conical shaped, surrounded by a layer of sound-insulating material whose thickness varies along the flow duct as measured in planes perpendicular to the direction of the flow, i.e. perpendicular to the flow duct.

Since the flow duct and the planar surfaces delimiting the sound-insulating material do not have any parallel surfaces, the thickness of the sound-insulating material can be continuously varied. The requirement of non-parallellity can be fulfilled by considering a simple manner of manufacture using a flow duct of circular cross-section and an outer casing of polygonal, suitably square cross-section, or a circular cross-section non-concentric with the flow duct, whereby the spaces between the flow duct and the outer casing can be filled with sound-insulating material. This embodiment is very advantageous, because air ducts mostly have square or circular cross-section.

The modifying of the thickness of the sound-insulating material can even be enhanced by the building-in of several parallel flow ducts.

If the flow ducts are made of flexible pipes bent to prevent straight-line sound radiation or transmission, new advantages can be obtained. The sound-absorbing devices produced in this manner can be built into in the pressure pipe (duct) of a network of air ducts.

BRIEF DESCRIPTION OF THE DRAWING

The above and other objects, features and advantages of the present invention will be more readily apparent from the following description, reference being made to the accompanying drawing in which.

SPECIFIC DESCRIPTION

Figure 1:
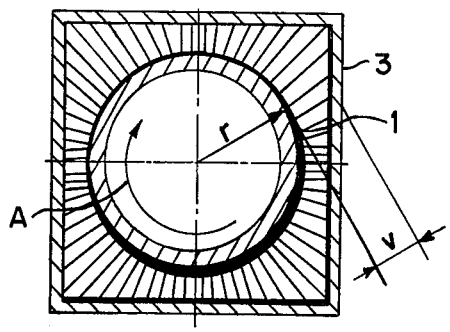
FIG. 1 is a diagrammatic cross sectional view through a system of the present invention, illustrating the variation in thickness of the sound-absorbing material in a plane perpendicular to the axis of the duct.

The principles of the present invention will be apparent from the diagram shown in FIG. 1 which can be considered to be a cross section taken prependicular to the axis of a cylindrical air-flow duct 1 (see FIG. 2) which is spacedly surrounded by a casing 3 of prismatic configuration, here rectangular or more specifically square cross section. The radial lines between the duct 1 and the casing 3 represent radial thickness of sound-absorbing material 2 (FIG. 2), the radial thicknesses being represented at v. The layer of sound-absorbing material has a thickness v whose ratio to the radius of the duct 1 is such that it corresponds to 0.3 to 0.5 in the preferred state as mentioned previously.

What is important to the invention, as has also been indicated, is that in each cross sectional duct 1, the thickness of the sound-absorbing material 2 varies continuously around the periphery of the air-flow duct, i.e. from point to point as represented by the radial lines in the sense of the arrow A shown in FIG. 1.

Figure 2:
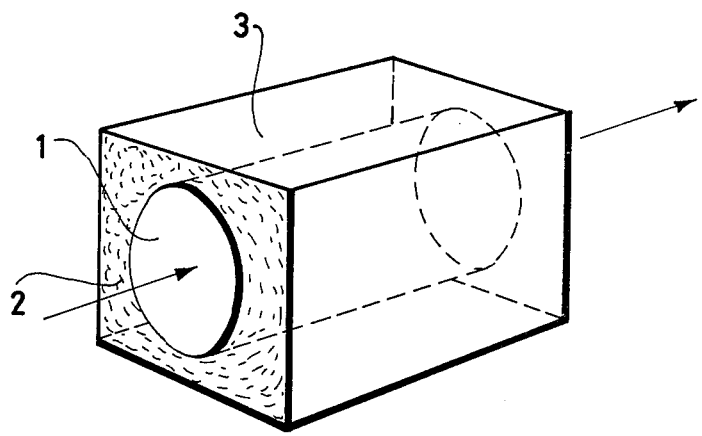
FIG. 2 is a diagrammatic perspective view of an embodiment of the invention utilizing a cylindrical duct.
Figure 3:
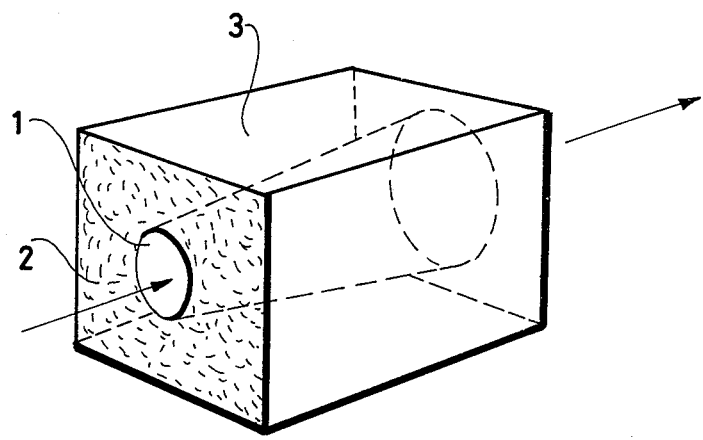
FIG. 3 is a view similar to FIG. 2 having a generally conical duct.

In FIG. 2, this is accomplished by providing the casing as a rectangular parallelepiped while the air-flow duct 1 is formed as a cylinder. However, the same can be achieved as shown in FIG. 3, by making the air-flow duct 1' of generally conical configuration while using a rectangular parallelepipedal casing 3 which can be same as that of FIG. 2.

Figure 4:
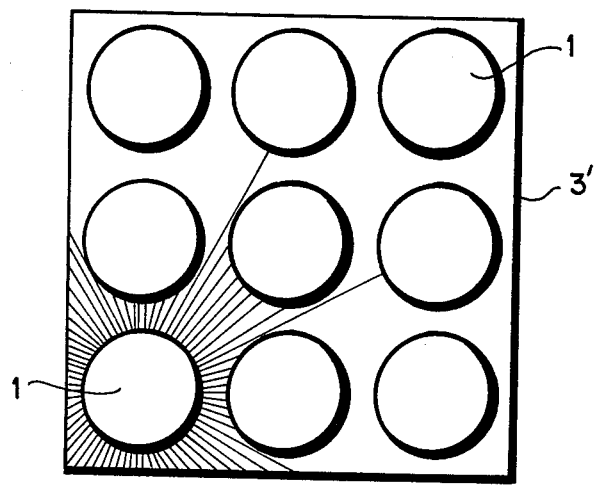
FIG. 4 is a view similar to FIG. 1 but showing a device, according to the invention, having a plurality of ducts in a single body of sound-absorbing material.

In FIG. 4 we have shown an arrangement in which a plurality of ducts 1 are provided in spaced apart relationship in a rectangular-section casing 3' so that here again, as represented by the radial lines radiating from the air-flow duct 1 in the lower left-hand corner, the thickness of sound-absorbing material varies continuously around the periphery of the duct. Naturally, this applies to each of the ducts 1 in the embodiment of FIG. 4.

Figures 5, 6:
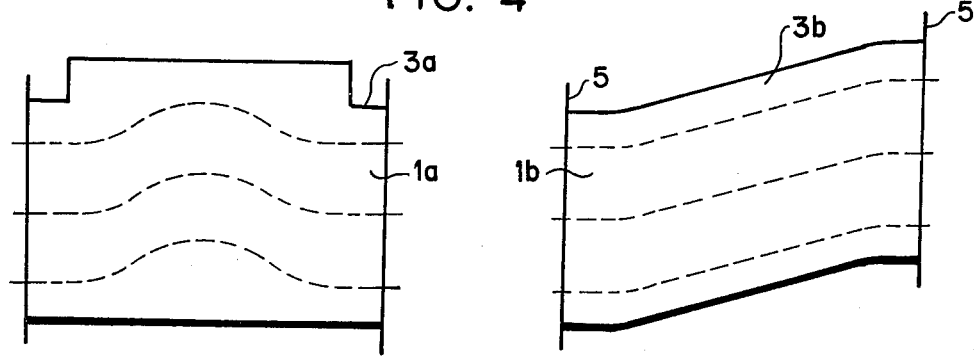
FIGS. 5 through 7 are diagrammatic elevational views showing other duct configurations according to the invention in which the air-carrying passage is bent between the inlet and outlet sides of the unit.
Figure 7:
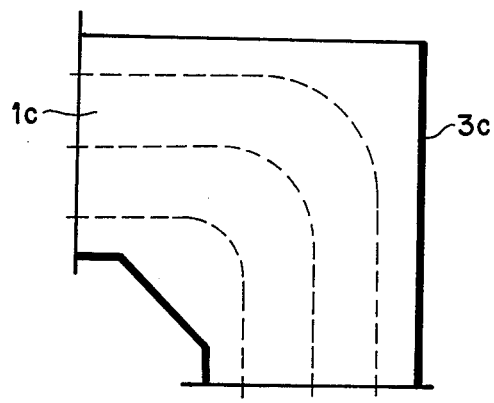

From FIGS. 5 through 7, it can be seen that the duct systems of the invention need not make use of straight line ducts but rather can have ducts whose paths are bent between inlet and outlet sides of the unit which can have connecting flanges 5. Here too the casings 3a, 3b and 3c are of generally prismatic while the ducts 1a, 1b and 1c, while being bent between their ends, are of round cross section as shown in FIGS. 1 through 4. As a result, in each plane perpendicular to the axis of the duct, the thickness of the sound-absorbing material will vary continuously around the periphery of the duct.

Figure 8:
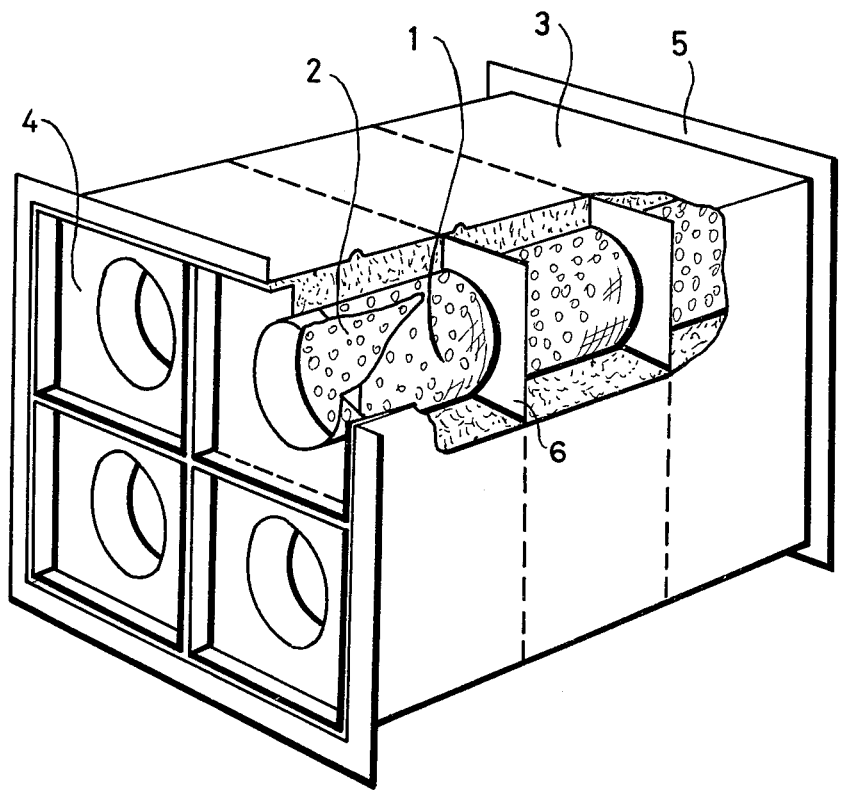
FIG. 8 is a perspective view, partly broken away, illustrating features of the invention.

FIG. 8, shown in somewhat less diagrammatic form, is an embodiment of the invention in which the unit is formed with flanges 5 at its ends and four ducts extending between the end source 4 of the unit. Each of the ducts 1 is surrounded by mass of sound-absorbing material filling the square section casing 3. Sound-absorbing materials of different type can be used, and plates 6 can be provided to separate the sound-absorbing material into respective sections within the casing. The wall of the ducts 1 can be perforated as has also been shown in FIG. 8.

We claim:

1. A sound-absorbing device for use in the transmission of ventilating air, comprising:
   a prismatic elongated casing having a pair of end walls and a plurality of angularly adjoining longitudinal walls;
   at least one air-flow duct of round cross section extending between said end walls and terminating therein while passing through said casing in all around spaced relation from said longitudinal walls; and
   a mass of sound-absorbing material without parallel surfaces filling said casing between said end walls and around said duct, said sound-absorbing material having a thickness around said duct as measured in each plane perpendicular thereto which varies continuously about the periphery of the duct, said casing having a square cross section in said planes and said duct having a circular cross section in said planes and being conical from one of said end walls to the other, a plurality of such ducts being provided in spaced-apart relation within said casing and being all spaced from said longitudinal walls, said sound absorbing-material surrounding each duct in each such plane, said sound-absorbing material being subdivided by plates in said casing perpendicular to said ducts.

* * * * *